United States Patent [19]

Schmid et al.

[11] Patent Number: 4,965,019

[45] Date of Patent: Oct. 23, 1990

[54] USE OF SELECTED END-GROUP CLOSED FATTY ALCOHOL ETHOXYLATES FOR LOW-FOAM, COLD-SPRAYABLE CLEANING AGENTS

[75] Inventors: Karl-Heinz Schmid, Mettmann; Alfred Meffert, Monheim; Gilbert Schenker, Erkrath; Adolf Asbeck; Juergen Geke, both of Duesseldorf, all of Fed. Rep. of Germany

[73] Assignee: Henkel Kommanditgesellschaft auf Aktien, Duesseldorf-Holthausen, Fed. Rep. of Germany

[21] Appl. No.: 295,334

[22] Filed: Jan. 10, 1989

[30] Foreign Application Priority Data

Jan. 11, 1988 [DE] Fed. Rep. of Germany ....... 3800490

[51] Int. Cl.[5] ........................ B01D 19/04; B08B 9/28; C11D 1/72; C11D 1/823

[52] U.S. Cl. .................................... 252/321; 134/25.2; 252/156; 252/174.21; 252/174.22; 252/358; 252/540; 252/559; 568/613

[58] Field of Search ...................... 252/174.21, 174.22, 252/321, 358, DIG. 1, 540, 559, 156; 134/25.2; 568/613

[56] References Cited

U.S. PATENT DOCUMENTS

| | | | |
|---|---|---|---|
| 2,596,091 | 5/1952 | Benneville | 252/135 |
| 2,626,243 | 1/1953 | Jacoby | 252/321 |
| 2,674,619 | 10/1953 | Schmid et al. | 260/485 |
| 2,841,621 | 7/1958 | Riley | 252/135 |
| 3,281,475 | 10/1966 | Boettner | 252/358 |
| 3,684,723 | 8/1972 | Best | 252/358 |
| 4,088,598 | 5/1978 | Williams | 252/135 |
| 4,366,326 | 12/1982 | Vodrazka | 568/613 |
| 4,396,776 | 8/1983 | Brockhaus | 568/613 |
| 4,405,490 | 9/1983 | Maas | 252/358 |
| 4,548,729 | 10/1985 | Schmid et al. | 252/174.21 |
| 4,624,803 | 11/1986 | Balzer | 568/613 |
| 4,780,237 | 10/1988 | Schmid | 252/174.22 |
| 4,797,222 | 1/1989 | Hoefer | 252/174.21 |

*Primary Examiner*—Dennis Albrecht
*Attorney, Agent, or Firm*—Ernest G. Szoke; Wayne C. Jaeschke; Real J. Grandmaison

[57] ABSTRACT

Foam-depressing additives comprising polyethyleneglycol ethers of formula I $$R^1—O—(CH_2CH_2O)_n—R^2 \quad (I)$$

in which $R^1$ represents a straight-chain or branched alkyl radical with 6 to 13 carbon atoms, $R^2$ represents an alkyl radical with 1 to 3 carbon atoms and n is a number from 2 to 6, for low-foam, preferably sprayable cleaning agents.

6 Claims, No Drawings

USE OF SELECTED END-GROUP CLOSED FATTY ALCOHOL ETHOXYLATES FOR LOW-FOAM, COLD-SPRAYABLE CLEANING AGENTS

BACKGROUND OF THE INVENTION

1. Field of the Invention

The invention concerns the use of fatty alcohol polyglycolethers with closed end-groups as foam-depressing additives in low-foam, sprayable cleaning agents.

2. Discussion of Related Art

Aqueous cleaning agents intended for use in commerce and industry, in particular those for cleaning metallic, glass, ceramic and plastic surfaces, generally contain substances which are capable of counteracting the unwanted formation of foam. The use of foam-depressing additives is required in the majority of cases because the impurities which are loosened from the substrates and which collect in the cleaning baths act as foaming agents. In addition, the use of anti-foaming agents may also be necessary because the cleaning agents themselves contain constituents which give rise to the unwanted formation of foam under the prescribed operating conditions, e.g., anionic surfactant or nonionic surfactant which foams at the operating temperature.

Thus, e.g. in the industrial cleaning process in the metal industry, good wetting alkaline aqueous solutions are used as cleaning agents to remove drawing and rolling oils or grease and organic corrosion inhibitors containing carboxyl groups. These solutions must be sprayable and free from foam at a pressure of 3 to 30 bar and a temperature of 20° to 90° C. For this reason, these cleaning operations require surfactants which not only produce little foam themselves, but which simultaneously act as defoamers for the other surfactant components used with them, e.g. anionic surfactants such as the surfactants containing alkylbenzene sulfonates or other sulfonic acid groups and carboxyl groups.

These desired properties are found, for example, in a class of nonionic surfactants which are generally known as ethylene oxide-propylene oxide block copolymers and are described e.g. in U.S. Pat. No. 2,674,619. These are particularly higher molecular weight compounds with a polyether structure which have marked foam-depressing properties and at the same time good dispersibility. However, these nonionic surfactants which are specifically geared to industrial cleaning processes have the serious disadvantage that they are not sufficiently biologically degradable according to the testing procedures for the surface-active compounds under the German Detergents Act.

German patent application No. 33 15 951 describes the use of polyethyleneglycolethers of the general formula Ia $$R^1—O—(CH_2CH_2O)_n—R^2 \quad \text{(Ia)}$$

in which $R^1$ represents a straight-chain or branched alkyl radical or alkenyl radical with 8–18 C atoms, $R^2$ represents an alkyl radical with 4–8 C atoms and n a number from 7 to 12, as foam-depressing additives in cleaning agents. These compounds, however, show no anti-foaming effect below 20°–25° C. It is, however, the foam-inhibition at low temperatures that is desired.

The problem at the basis of the present invention was therefore to find foam-depressing substances with industrial application properties which are superior to those of the agent in the prior art at temperatures below 20°–25° C. and which at the same time have the necessary biological degradability. The solution to this problem came from the realization that certain short-chain end-group closed addition products of ethylene oxide on selected aliphatic alcohols defined in the following can meet the set requirements both with regard to their usability for industrial applications (foam inhibition and stable formulation in the temperature range of −5° to +50° C.) and their biological degradability.

It is therefore an object of this invention to provide a nonionic surfactant which meets the desired requirements in particular for industrial cleaning processes.

DESCRIPTION OF THE INVENTION

Other than in the operating examples, or where otherwise indicated, all numbers expressing quantities of ingredients or reaction conditions used herein are to be understood as modified in all instances by the term "about".

It was surprisingly discovered that shorter-chain polyethyleneglycolethers in contrast to the known longer-chain polyethyleneglycol ethers of German patent application No. 33 15 951 have an excellent anti-foaming effect at temperatures of less than 20°–25° C.

The invention therefore concerns the use of polyethyleneglycolethers of general formula I $$R^1—O—(CH_2CH_2O)_n—R^2 \quad \text{(I)}$$

in which $R^1$ represents a straight-chain or branched alkyl radical with 6 to 13 carbon atoms $R^2$ represents an alkyl radical with 1 to 3 carbon atoms, and n is a number from 2 to 6, as foam-depressing additives for low-foam cleaning agents, which are suitable as sprays, and particularly as cold sprays.

In a preferred embodiment of the invention, polyethyleneglycol ethers of the formula I are used in which n equals 2 or 3. Particularly preferred is the use of compounds of formula I in which $R^2$ represents the methyl radical and this being the case it is further preferred that $R^1$ represents an octyl or decyl radical.

The compounds according to the invention can by way of example be prepared under the known conditions of Williamson's ether synthesis (for an overview see: Houben Weyl, Methoden der organischen Chemie, VI/3, 24, 54, 109).

One such method is, for example, to react a dialkylsulfate or alkylhalide such as dimethylsulfate, diethylsulfate or methylchloride, ethylchloride and propylchloride with alcohol-ethoxylates containing 2 to 3 moles of ethylene oxide per mole of alcohol. Suitable alcohols may be used individually or in mixtures, e.g. fatty alcohols such as n-octanol, n-nonanol, n-decanol, n-undecanol, n-dodecanol and their isomers branched on the alkyl radical and their isomers with OH-groups on the interior C atoms, but also oxo-alcohols with the afore-mentioned carbon atom content.

Another method of preparation employs the reaction of, e.g. methylethyleneglycol, methyl-di- or triethyleneglycol, ethylethyleneglycol,ethyl-di- or triethyleneglycol, propylethyleneglycol, propyl-di or -triethyleneglycol (used individually or in mixtures) with alkylhalides such as n-octylchloride, n-nonylchloride, n-decylchloride, n-undecylchloride, n-dodecylchloride and their isomers branched on the alkyl radical, again used either individually or in mixtures.

The biological degradability of the end-group closed alkyl polyethyleneglycol ethers of general formula (I) that are to be used according to the invention is, using the statutory methods of measurement, an over 80% Bismuth active substance decrease (Bi AS, according to the provisions by ordinance for the German Detergents Act).

The end-group closed polyethyleneglycol ethers of formula I that are to be used according to the invention are distinguished by their alkali and acid stability. The foam-preventing effect of the compounds of formula I at temperatures of less than 20° to 25° C. in alkaline to weakly acid cleaning baths is superior to that of known foam inhibitors.

The cleaning agents in which the end-group closed polyethyleneglycol ethers (I) are used according to the invention, can contain the normal constituents of such agents, such as wetting agents, builder substances and complexing agents, alkalis or acids, corrosion inhibitors and if necessary, also anti-bacterial active substances or organic solvents.

As wetting agents one may consider non-ionogenic surface-active substances, such as polyglycolethers, which are obtained by the addition of ethylene oxide to alcohols, particularly fatty alcohols, alkylphenols, fatty amines and carbonic acid amides, and anion-active wetting agents, such as salts of alkali metals, amines and alkanolamines from fatty acids, alkyl-sulfuric acids, alkyl-sulfonic acids and alkyl-benzenesulfonic acids. As builder substances and complexing agents the cleaning agents can contain primarily alkali metal orthophosphates, -polyphosphates, -silicates, -borates, -carbonates, -polyacrylates and -gluconates and citric acid, nitrilotriacetic acid, ethylenediaminetetraacetic acid, 1-hydroxyalkane-1, 1-diphosphonic acids, amino-tri-(methylene phosphonic acid) and ethylene diamine tetra-(methylene phosphonic acid), phosphono-alkane-polycarbonic acids, e.g. phosphono-butane-tricarbonic acid, and alkali metal salts or amine salts of these acids. Highly alkaline cleaning agents, particularly those for the cleaning of bottles, contain considerable amounts of caustic alkali metal salt in the form of sodium and potassium hydroxide. If particular cleaning effects are required, the cleaning agents can contain organic solvents, e.g. alcohols, benzene fractions and chlorinated hydrocarbons and free alkanol amines.

In connection with the invention "cleaning agent" is understood primarily to mean the aqueous solution intended for direct use on the substrates to be cleaned. In addition, the term cleaning agent also includes the concentrates and solid mixtures intended for the preparation of the application solutions.

The solutions, ready for use, may be weakly acidic to strongly alkaline.

The end-group closed polyethyleneglycol ethers to be used according to the invention are preferably added to the cleaning agents in such quantities that their concentration in the ready-to-use application solutions is 10 to 2500 ppm, and 50 to 700 ppm is particularly preferred.

The invention is explained in more detail by the following examples.

In the following examples, testing of the anti-foaming effect is conducted as follows:

A mixture of 7 or 10 g of cleaner concentrate as specified in examples 1 and 2 or in comparative examples 1 to 3, and 493 or 490 g of water having a water hardness of 16° d. (°d.=German hardness) is poured into a double-walled 2-liter measuring cylinder. With the help of a laboratory hose pump, the liquid is circulated at a rate of 4 liters per minute. During this process the test solution is drawn up to approx. 5 mm above the bottom of the measuring cylinder by means of a glass tube 55 cm long (inside diameter 8.5 mm, outside diameter 11 mm), which is connected to the pump via a silicon hose, and the mixture is recirculated in free fall via a second glass tube (length 20 cm) which is attached at the 2,000 ml mark. During the circulation the test solution is continually heated for 45 minutes beginning at 15° C., and up to 65° C. In the following examples the cleaning solution is described as "sprayable for industrial application at the temperature specified and higher" when the amount of foam at this temperature equals 100 ml maximum.

In examples 1 to 3 a polyethyleneglycolether of formula (I) was tested, in which $R^1$ represents a $C_{8-10}$-n-alkyl radical, $R^2$ a methyl group and n equals 2 (=surfactant A). In comparative examples 1, 2 and 4 on the one hand a polyethyleneglycolether of formula (Ia) as described in German patent application No. 33 15 951 was tested, in which $R^1$ represents a $C_{12-18}$-n-alkyl radical, $R^2$ a $C_4$-alkyl radical and n equals 10 (=surfactant B). On the other hand for comparative examples 3 and 5, the reaction product of ethylene diamine with 30 mole ethylene oxide and 60 mole propylene oxide was tested (=surfactant C), which unlike the surfactants A and B is not biologically degradable. The following compositions were evaluated.

EXAMPLE 1

7% caprylic acid
5% capric acid
3% sodium hydroxide.
5% sodium tetraborate × 10 $H_2O$ (Borax)
7% sodium tripolyphosphate
5% triethanolamine
1% monoethanolamine
3% surfactant A
64% de-ionized water This cleaner concentrate was crystal-clear during 2 weeks of storage at −5° C., at +25° C. and at +50° C.

An aqueous solution of 10 g of this cleaner concentrate in 490 g of water having a water hardness of 16° d. was sprayable for industrial application at 15° C. and higher and showed no interfering foam formation.

COMPARATIVE EXAMPLE 1

7% caprylic acid
5% capric acid
3% sodium hydroxide
5% sodium tetraborate × 10 $H_2O$ (Borax)
7% sodium tripolyphosphate
5% triethanolamine
1% monoethanolamine
3% surfactant B
64% de-ionized water In comparison with Example 1 a longer-chain polyethylene glycolether (Ia) as described in German patent application No. 33 15 951 was tested. This cleaner concentrate was crystal-clear during 2 weeks of storage at −5° C., at +25° C. and at +50° C.

An aqueous solution of 10 g of this cleaner concentrate in 490 g of water having a water hardness of 16° dH was only sprayable for industrial application at temperatures > 40° C.

EXAMPLE 2

14.00% maleic acid isooctylsemiamide, neutralized with triethanolamine
3.75% nonylphenol-6.5 EO
2.25% caprylic acid
1.50% capric acid
15.00% diethanolamine
3.00% surfactant A
60.5% de-ionized water This cleaner concentrate was crystal-clear during 2 weeks of storage at −5° C., at +25° C. and at +50° C.

An aqueous solution of 7 g of this cleaner concentrate in 493 g of water having a water hardness of 16° d. was sprayable for industrial application at 15° C. and higher.

COMPARATIVE EXAMPLE 2

14.00% maleic acid isooctylsemiamide, neutralized with triethanolamine
3.75% nonylphenol-6.5 EO
2.25% caprylic acid
1.50% capric acid
15.00% diethanolamine
3.00% surfactant B
60.50% de-ionized water This cleaner concentrate was crystal-clear during 2 weeks of storage at −5° C., at +25° C. and at +50° C.

An aqueous solution of 7 g of this cleaner concentrate in 493 g of water having a water hardness of 16° d. was only sprayable for industrial application at temperatures > 40° C.

COMPARATIVE EXAMPLE 3

14.00% maleic acid isooctylsemiamide, neutralized with triethanolamine
3.75% nonylphenol-6.5 EO
2.25% caprylic acid
1.50% capric acid
15.00% diethanolamine
3.00% surfactant C
60.50% de-ionized water This cleaner concentrate was crystal-clear during 2 weeks of storage at −5° C., at +25° C. and at +50° C.

In comparison to example 2, surfactant C is not biologically degradable.

An aqueous solution of 7 g of this cleaner concentrate in 493 g of water having a water hardness of 16° d. was only sprayable for industrial application at temperatures > 30° C.

The following examples show the better possibilities of formulation using surfactant A compared with surfactant B and surfactant C.

EXAMPLE 3

5% nonylphenol-6.5 EO
3% caprylic acid
2% capric acid
9% potassium diphosphate
9% sodium salt of nitrilotriacetic acid
2% naphthaline acid condensation product
10% surfactant A
60% de-ionized water This cleaner concentrate was crystal-clear during 2 weeks of storage at −5° C., at +25° C. and at +50° C.

COMPARATIVE EXAMPLES 4 AND 5

If surfactant A is replaced by surfactant B (comparative example 4) or surfactant C (comparative example 5) in the cleaner formulation of Example 3, in both cases cleaner concentrates are obtained which separate into two phases after about 30 minutes at 25° C.

We claim:

1. The process of controlling the generation of foam from an alkaline to weakly acidic cleaning composition comprising adding to said composition from about 10 to about 2500 ppm of a polyethyleneglycol ether of formula I $$R^1\text{—O—}(CH_2CH_2O)_n\text{—}R^2 \quad (I)$$

in which $R^1$ represents a straight-chain or branched alkyl radical with 6 to 13 carbon atoms, $R^2$ represents an alkyl radical with 1 carbon atom, and n is a number of 2 or 3, as a foam-depressing additive, and spraying said composition as an aqueous solution at a temperature of less than about 25° C.

2. A process as in claim 1 wherein said aqueous solution contains from about 50 to about 700 ppm of said polyethyleneglycolether.

3. A process as in claim 1 wherein said composition contains a wetting agent, builder substance or complexing agent, alkali or acid, corrosion inhibitor, or organic solvent.

4. A process as in claim 3 wherein said wetting agent is selected from an anionic and nonionic surfactant.

5. A process as in claim 3 wherein said builder substance or complexing agent is selected from an alkali metal orthophosphate, polyphosphate, silicate, borate, carbonate, polyacrylate, gluconate, nitrilotriacetic acid, ethylenediamine-teteraacetic acid, and phosphonic acid.

6. A process as in claim 3 wherein said composition contains sodium hydroxide or potassium hydroxide.

* * * * *